Oct. 25, 1932.  A. GREINER  1,884,665
METALLIC TREATMENT OF VITREOUS MATERIALS
Filed Oct. 5, 1929  2 Sheets-Sheet 1
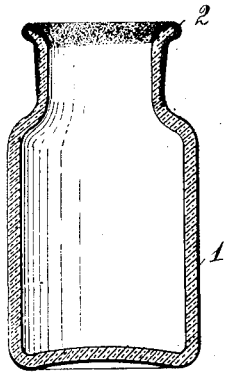
Fig. 1.
Fig. 2.
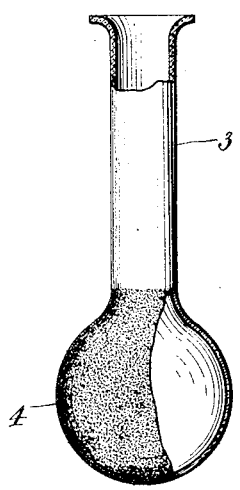
Fig. 3.
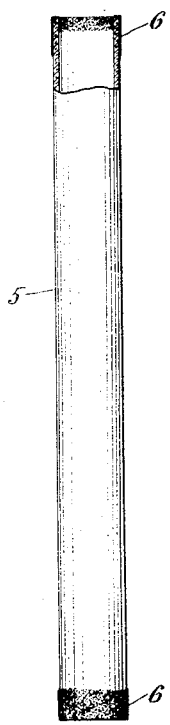
Fig. 4.
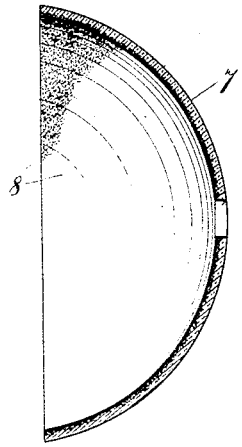
Fig. 5.
Fig. 6.
Fig. 7.
Fig. 8.
INVENTOR:
A. GREINER
By [signature]
ATTORNEY.

Oct. 25, 1932.     A. GREINER     1,884,665
METALLIC TREATMENT OF VITREOUS MATERIALS
Filed Oct. 5, 1929     2 Sheets-Sheet 2
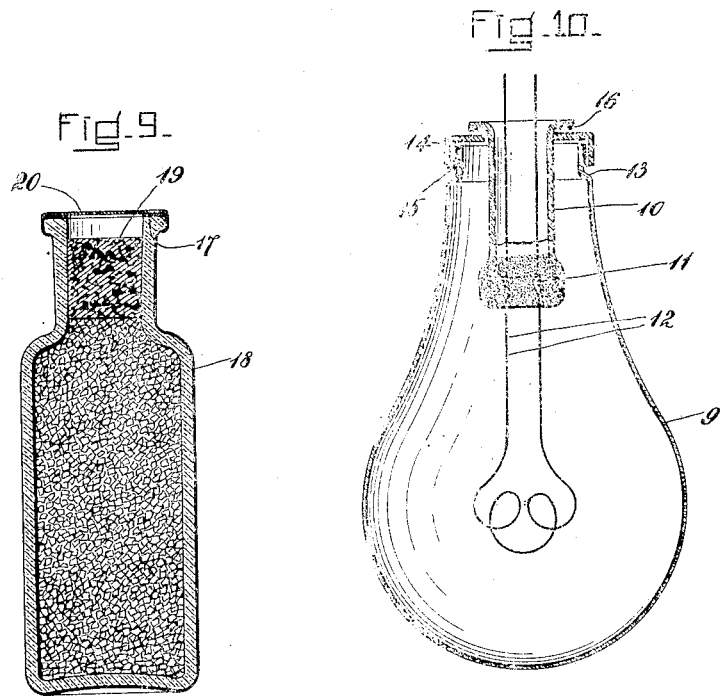
INVENTOR:
A. GREINER
BY [signature]
ATTORNEY:

Patented Oct. 25, 1932

1,884,665

UNITED STATES PATENT OFFICE

ALFRED GREINER, OF BOSTON, MASSACHUSETTS, ASSIGNOR OF FORTY PER CENT TO RENS E. SCHIRMER, OF NEWTON, MASSACHUSETTS, AND TWENTY PER CENT TO LAWRIE L. WITTER, OF JAMAICA PLAIN, MASSACHUSETTS

METALLIC TREATMENT OF VITREOUS MATERIALS

Application filed October 5, 1929. Serial No. 397,637.

This invention relates to the treatment of vitreous materials with metals, their salts and oxides for various purposes such, for example, as forming an intimate physical or/and chemical union therebetween for sealing or the like, forming a metal coating for heat conducting and tensile strength increasing purposes, providing acid-resisting and metal-reflecting surfaces, etc., and it is an object of the invention to provide a process of producing these effects with great facility.

Another object of the invention resides in the provision of an improved process of sealing a metal body to a vitreous body, such as the sealing of glass jars and bottles by metal caps. Heretofore no practicable process of sealing such jars and the like, without bringing the jar to a plastic or semi-plastic condition, has been known. In accordance with my invention the jar or other object to be treated is provided with a sealing metal surface, preferably during the manufacture of the jar, and a cap or other metal member may thereafter be soldered to this surface without in any manner affecting the contents of the jar.

My invention contemplates the metallizing of the surfaces of vitreous articles or bodies in a manner providing a well defined metallic or metallic compound coating upon and in intimate and secure contact therewith, whereby, for many purposes, the surface can be utilized and treated as though the entire body thereof were of metal. I secure this novel result by first treating the vitreous surface with the metal or a compound thereof in such a manner as to impregnate or combine, under the action of heat, a compound of the metal with the vitreous material on and extending into the material beneath its said surface, and it appears that this compound ordinarily includes both the vitreous material and the metal in the form of an oxide thereof. After thus coating and impregnating the surface with this metallic compound, I may subject the same to a reducing treatment, whereby a metallic coating is left on and in intimate and secure contact with the vitreous surface. The formation of such a coating on a vitreous surface by a process of this nature comprises a further object of my invention.

With the above and other objects in view, as will hereinafter appear as the description proceeds, my invention consists in the features set forth in the following specification and illustrated in the accompanying drawings. In such drawings I have illustrated certain specific applications of my invention, but it will be understood that the invention has other applications and that the drawings are not to be construed as defining or limiting the scope of the invention, the claims appended hereto being relied upon for that purpose.

Referring to figures of the drawings:

Fig. 1 is a sectional view of a glass jar having its open end metallized by my process to produce a soldering surface.

Fig. 2 is an elevation thereof.

Fig. 3 illustrates a flask having its bottom portion metallized by my process to increase its heat conductivity and tensile strength.

Fig. 4 illustrates a gage tube having its ends metallized by my process to produce soldering surfaces.

Fig. 5 illustrates a member metallized by by process to produce a reflecting surface.

Fig. 6 illustrates a glass jar.

Fig. 7 illustrates a thin copper washer to be used in sealing the jar.

Fig. 8 illustrates a thin copper cap to cooperate with the washer in sealing the jar.

Fig. 9 illustrates the jar in sealed condition.

Fig. 10 illustrates an incandescent lamp wherein copper lead-in wires are sealed into a portion of the glass tube metallized by my process and wherein the neck of the bulb is sealed by another application of my invention.

It is well known that the properties of glass, quartz, porcelain and other vitreous materials are such as to render these materials difficult and even impossible of certain working operations and functions, particularly in connection with metals. For example: The co-efficient of expansion of glass is such that only metals which have a like co-efficient of expansion, as platinum, can be sealed therein; a sealing joint between metal and glass can be made only when the glass is heated to a plastic or semi-plastic condition; and the capacity to conduct heat, reflect and transmit light, etc., is inadequate for many purposes. It is one object of my invention to so treat these vitreous materials that their properties will be so changed as to adapt the materials to various valuable uses heretofore impossible. While I herein frequently refer to "glass," I wish it to be understood that the invention, while particularly applicable to glass, is in no manner limited thereto and the term "glass" is intended to include all other vitreous materials to which the invention may be applied.

The invention broadly contemplates the treatment of vitreous bodies with metals or their compounds, and more especially their oxides, with the application of heat, so to impregnate the bodies on and beneath their surfaces with the metal or its compound as to form a physical-chemical union therebetween. By thereafter subjecting the treated body to a reducing atmosphere the surface portion of the metallic compound is reduced to its pure metallic state and forms a metallic coating on the body which coating is in intimate contact with the metallic compound beneath the surface of the body and, therefore, substantially an integral part of the body. One aspect of the invention as described herein comprises the treatment of the vitreous body with an oxide of the metal under the action of sufficient heat to cause the oxide to unite with the body on and beneath its surface, and while the scope of the invention is by no means limited to the time or means of applying the oxide or other metallic compound to the vitreous body, I have preferred to herein describe a process wherein the same is applied to the vitreous body while the body is in its heated condition. In accordance with such process, I may oxidize the metal, its salts or compounds and directly combine the resulting oxide with the heated vitreous material. The metallic element used may be in the form of a solid, powder or solution. In carrying out the process, I have found copper chloride to give very excellent results although it is understood that silver chloride, gold, aluminum and other metals in various forms may be used.

In proceeding with the process in a non-reducing atmosphere, I have used a high temperature flame. I place the vitreous body to be metallized, such as a glass tube, in the flame and heat the body or its surface preferably to a somewhat fused or semi-plastic condition. I then introduce the metallic element into the base or oxidizing portion of the flame where it combines with oxygen to form the metallic oxide. The flame carries this oxide to the vitreous material in the flame where it forms a physical-chemical combination with the vitreous body. I thereafter introduce the body, in its heated condition, into a reducing atmosphere. The oxide on or near the surface is thereupon reduced to the metallic state and the body left impregnated with the metal and its oxide. It should be understood that for some purposes it may be desired to leave the metal in its oxide form on and in the vitreous material. In such case, I simply omit the reducing step.

In practicing my invention in the manner above defined, it appears from observation that the metal or the metal compounds used is changed into an oxide form and carried over by the flame to the vitreous body being treated. It is quite conceivable, however, that the degree of change may depend on several factors and particularly on the amount of metal used. In practicing the invention, I have preferred to use a compound of the metal and I have been careful to use just the amount necessary to perform the desired operations. The results have been as stated. However, since it is impossible to know these reactions, and particularly the chemical reactions, with exactness, I wish to describe the function merely as the changing of the metal or a portion thereof into such a form that it is carried over and deposited onto the vitreous body by the medium of a gaseous flame. I also wish it to be understood that my invention contemplates the use of suitable metals either in their metallic or compound states, and any reference to "metal" herein is intended to include compounds of the metal.

As heretofore stated, my process is applicable to all vitreous materials as far as I am aware and, while I have herein more specifically illustrated and described the application of the invention to such materials as glass, glazed bodies, etc., which fuse at relatively low temperatures, it will be understood that I have no intention of limiting the invention thereto. It is well known that other vitreous materials, such as quartz, unglazed porcelain, etc., have very high melting points and will only fuse at correspondingly high temperatures. I have metallized the surfaces of such vitreous materials by my process at temperatures lower than their melting or fusing points and in such cases these treated surfaces have been heated to a glowing temperature and have not appeared to fuse. I furthermore desire it to be understood that by the term "semi-plastic" as used in the specification, I mean the fusing or softening of the material at its surface by the application of heat thereto.

The specific treatment applied varies with the results it is desired to produce. For example, to provide a reflecting surface it is necessary that the metal shall be deposited beneath the surface, whereas for some other purposes, such as preparation of the surface for soldering, it is necessary that there shall also be a considerable deposit of the metal on the surface. My process, therefore, contemplates variations between two extremes, one of which results in depositing most of the metal beneath the surface with little, if any, deposit on the surface, and the other of which results in depositing most of the metal in the form of a layer combined with the glass on its surface.

These results and any desired variations thereof can be entirely controlled by temperature and time of the treatment. Securing a reflecting surface requires less metal and a relatively short treatment at a moderate temperature. Securing a deposited layer on the surface requires a considerably longer treatment which can also be hastened by a higher temperature. It should be understood that in all cases a portion of the metal is deposited beneath the surface thereby intimately uniting the metal on the surface with the vitreous material. The metal which unites with the glass or other vitreous body beneath the surface thereof cannot be removed physically as by scratching, heating up to the melting point of the glass, etc., and is not affected chemically as by any acid other than hydrofluoric acid.

Furthermore the combining of the metal with the glass so changes its characteristics that the glass is rendered adaptable to many uses heretofore impossible.

In Figs. 1 and 2 of the drawings, I have illustrated a glass jar 1 in which the open end 2 has been metallized by the above-described treatment. This end has thus been so impregnated, particularly at the surface, that the same readily receives solder for sealing a cap to the jar. It will be understood that a solder coating may be provided on the metallized surface at any time following the metallizing operation. The jar may thereafter be filled with any material to be preserved and a metal cap applied merely by applying sufficient heat to soften the solder coating. It should be understood that in commercial practice the jar is preferably treated as above-described during the process of its manufacture whereby the manufacture of the jar, as illustrated, is completed in one operation.

In Fig. 3, I have illustrated a flask 3 in which the bottom portion 4 has been likewise metallized. The uniting of the metal with the glass has so greatly increased the heat conductivity and tensile strength of the glass that the flask is adapted to perform its functions with greatly increased facility.

In Fig. 4, I have illustrated a gage tube 5 having its ends 6 metallized. This treatment adapts the ends to be readily joined, and sealed to co-operating parts in the same manner as though the entire tube were of metal. For this and some other sealing operations a more secure seal, such as is had by welding, may be preferred and I therefore desire it to be understood that any fusing operation, including either welding or soldering, may be used as may seem desirable in each case.

In Fig. 5, I have illustrated a reflecting member 7 as provided with a reflecting surface 8 by my process. The process is easily controlled at will to produce either a bright or dull reflecting surface. It should, furthermore, be understood that, metal being deposited beneath the surface of the glass to a substantial depth, the reflecting surface can not be marred or scratched nor affected by air, moisture, acids or heat up to the melting point of the glass. The surface can furthermore be marked in any manner, as in making graduated reflecting scales, without damage to the reflecting surface thereof. It may also be stated that treatment of one surface renders both opposite surfaces thereof reflective.

The process by which the above articles, as examples, are made is simple, quick, cheap and dependable. Any object, shape or form can be treated at any stage of its manufacture, it being understood that the process ordinarily leaves the article in its finished condition. Copper, silver, nickel and gold appear to be the best metals for performing the process, copper being ordinarily used because of its cheapness.

In Fig. 10 I have illustrated an incandescent lamp treated and manufactured in accordance with my process. This lamp comprises a bulb 9 and a lead-in tube 10. The sealing-in portion 11 of the tube has been treated by my process to make its coefficient of expansion more nearly equal to that of copper. Copper lead-in wires 12 have then been sealed into this portion. The neck 13 of the bulb, with the tube therein, is then closed by a metal ring 14, sealed by my process. The surface 15 of the neck and the surface 16 of the tube are treated by my process to metallize the same for soldering. The ring is then soldered both to the neck and tube as will be understood. This application of my process thereby produces an incandescent lamp in a much simpler and cheaper manner than has been possible heretofore.

My process of treatment as above-described so impregnates the vitreous body with metal that a very secure seal is attained. This type of seal is not only desirable but essential when dealing with pressure or vacuum. In some other cases, however, such as the sealing of glass jars as shown in Fig. 1, it may not be necessary or desirable to provide so secure a seal. The sealing of jars containing any volatile substance, as perfume, bath salts etc., or wherein it is desired to exclude the air, as in canning edibles, would appear to be served by a less secure and possibly cheaper seal. I therefore illustrate in Figs. 6 to 9 an alternative method which may be used in such cases.

This method embodies the use of a sealing foil washer 17. This washer is preferably made of very thin sheet metal such as copper. When the jar 18 is being manufactured and is in its plastic or semi-plastic condition this washer is pressed onto its open end, the washer thereupon adhering in sealed contact to the jar. The jar, as it leaves the glass factory, is therefore ready for filling and sealing. When the jar is filled, a suitable separator and closure, such as a cork 19 may be provided to separate the contents from the sealing cap and also provide a closure member to be used after the seal is broken. A thin copper foil cap 20 is thereafter soldered to the washer, the small local heat necessary for this operation in no manner affecting the jar or its contents. The jar is thereby perfectly sealed and the sealing cap is so thin as to be easily removed when desired.

I claim:

1. A process of metallizing a vitreous body, consisting of treating the surface of the body in its heated condition with a metallic compound to impregnate the body on and beneath the surface with the compound.

2. A process of metallizing a vitreous body, consisting of oxidizing a metal, and immediately treating the body in its heated condition therewith.

3. A process of metallizing a vitreous material, consisting of heating a metal in an atmosphere to produce a compound of the metal, and immediately treating the vitreous material in its heated condition therewith to impregnate the material with the compound.

4. A process of metallizing a vitreous material, consisting of treating the material in its heated condition with an oxide of the metal to impregnate the material with the oxide, and subjecting the same to a reducing atmosphere whereby to leave the material impregnated with the metal.

5. A process of metallizing a vitreous material, consisting of heating a metal in an oxydizing atmosphere to produce an oxide of the metal, and immediately treating the vitreous material in its heated condition therewith.

6. A process of metallizing a vitreous material, consisting of heating a metallic substance in one portion of a flame, to form a compound of the metal, and treating the vitreous material in its heated condition therewith in another portion of the flame.

7. A process of metallizing a vitreous material, consisting of heating a metallic substance in the oxydizing portion of a flame to form an oxide of the metal, and treating the vitreous material in its heated condition therewith in another portion of the flame.

8. A process of sealing a metal body to a vitreous body, consisting of so treating the vitreous body in its heated condition with a metallic compound that the same thereof intimately unites with the body and forms a metallic surface thereon, and thereafter sealing the metal body to the surface by a fusing operation.

9. A process of sealing a metal body to a vitreous body, consisting of so treating the vitreous body in its heated condition with a metallic compound that the compound unites with the body, subjecting the body to a reducing atmosphere whereby a metallic surface is left thereon, and thereafter sealing the metal body to the surface by forming a fused metallic union therebetween.

10. A process of metallizing the surface of a vitreous material, consisting of treating the surface with the metal or a compound thereof and with the application of heat to provide on the surface and extending intimately thereinto an oxide of the metal, and subjecting the treated surface to a reducing atmosphere whereby to reduce the oxide and leave a metallic coating on and in intimate and secure contact with the surface.

11. A process of metallizing the surface of a vitreous material, consisting of treating the surface with a metal compound and with the application of heat to provide on the surface and extending intimately thereinto a compound including the metal and said material, and subjecting the treated surface to a reducing treatment whereby to leave a metallic coating on and in intimate and secure contact with the surface.

12. A process of metallizing the surface of a vitreous material, consisting of treating the surface with a metal compound and with the application of heat to provide on the surface and extending intimately thereinto an oxide compound of the metal and said material, and subjecting the treated surface to a reducing atmosphere whereby to reduce the oxide and leave a metallic coating on and in intimate and secure contact with the surface.

13. The process of metallizing a vitreous surface which consists in causing a metallic oxide to combine therewith, and then reducing the combined oxide to a metallic form.

In testimony whereof I affix my signature.

ALFRED GREINER.